United States Patent Office 3,403,755
Patented Oct. 1, 1968

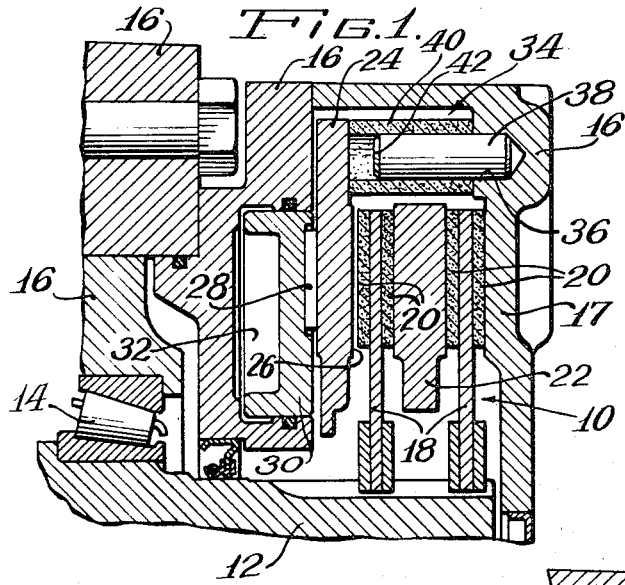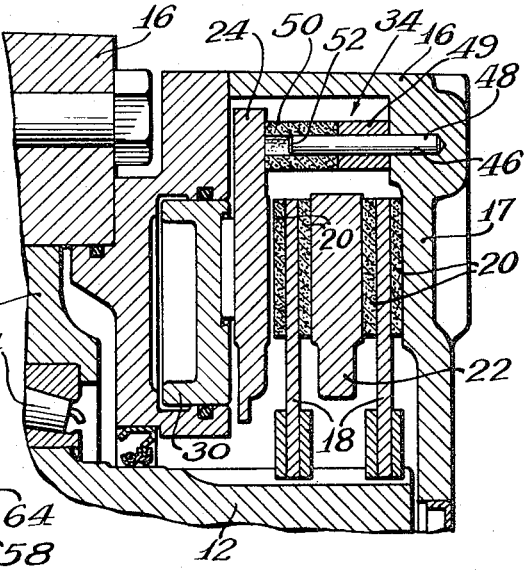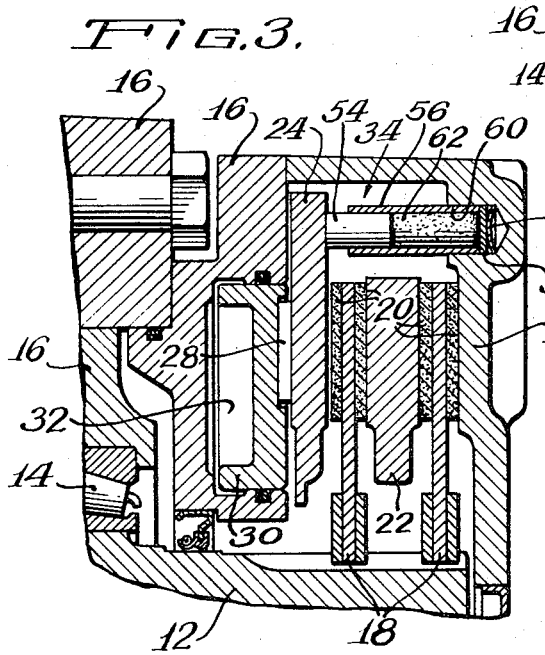

3,403,755
BRAKE RETURN AND AUTOMATIC ADJUSTMENT MEANS
Robert David Barrett, Westchester, and James T. Rohrbacher, Chicago, Ill., assignors to International Harvester Company, Chicago, Ill., a corporation of Delaware
Filed Apr. 27, 1967, Ser. No. 634,266
14 Claims. (Cl. 188—72)

ABSTRACT OF THE DISCLOSURE

The invention relates to a disk brake having a plurality of rotor disks affixed to a rotatable axle, a stator disk carried by a stationary housing, and a pressure plate movable under the influence of a hydraulically actuated piston to force said disks into frictional engagement. An automatic adjusting means in the form of metal particles is provided to compensate for wear of the disks and for separating the disks upon release of the hydraulic pressure.

Background and summary of the invention

The present invention relates to wheel brakes for vehicles generally, and more particularly, to wheel brakes which move parallel to the axis of rotation.

After repeatedly applying the brake, the disks, or the linings affixed thereto, will become worn. It is, therefore desirable to adjust the disks to compensate for this wear, and many attempts have been made in the prior art to provide such compensation automatically. In addition, the pressure plate which is forced against the disks to frictionally engage them is often actuated by a fluid pressure, which pressure cannot supply a retracting force, and hence, due to frictional resistance between the movable elements of the brake, and also due to the presence of a small residual or precharge pressure, the plate is never fully retracted to providing a running clearance between the disks. This causes the disks to drag or rub, resulting in overheating and excessive wear even when the brake is not being applied. Prior art is replete with mechanisms to retract the pressure plate or otherwise disengage the brake following release of the actuating pressure. However, in all of the prior art devices the automatic adjusting means and the return means are provided as separate and distinct elements. Providing these means as separate elements, while functionally satisfactory, results in a product which is costly due to the large number of components required, which is complicated to assemble and disassemble, and which requires that space within the housing be provided to ccommodate the separate elements. In most disk brake applications the latter consideration is important because the space limitations are critical, and any means which will effect a compact structure is eagerly sought.

It is, therefore, an object of the present invention to provide a disk brake which is compact, easily assembled, and relatively inexpensive.

It is also an object of the present invention to provide a unitary element for a brake which will serve both as a means for automatically compensating for wear and as a spring means to release the brake.

These and other objects and many of the attendant advantages of the present invention will become more readily apparent upon a perusal of the following description and the accompanying drawings.

Brief description of the drawings

FIGURE 1 is a cross-sectional view in elevation, with portions broken away and omitted, of a disk brake incorporating a preferred embodiment of the present invention;

FIGURE 2 is a view similar to FIGURE 1, but illustrating another embodiment of the present invention; and FIGURE 3 is a view similar to FIGURES 1 and 2, but showing still another embodiment of the invention.

Referring now to the embodiment shown in FIGURE 1, a disk brake mechanism, indicated generally at 10, is utilized to stop or retard an axle 12 rotatably mounted by a bearing 14 within a housing 16 having a vertical wall 17, which housing for convenience of manufacture may consist of several parts, but which are secured together and function as a unitary structure. The brake mechanism 10 includes a pair of rotor disks 18 each having a lining 20 secured to opposite faces thereof. The rotor disks 18 are keyed or otherwise secured to, but axially slidable on, the axle 12 and rotate therewith. A stator disk 22 is positioned between the rotor disks 18 and secured to the housing 16, but is movable with respect to the housing along the axis of the axle 12. The rotor and stator disks comprise the movable and stationary members respectively, and when forced into frictional engagement retard or stop the rotation of the axle 12.

A primary or pressure plate 24 is retained within, and is movable with respect to the housing 16 axially of the axle 12. The primary plate 24 has a flat surface 26 formed on one side for engagement with the lining 20 on the inner surface of the inboard rotor disk 18, and has a heat insulating washer 28 secured to the other side. The washer 28 provides a surface or area, through which the conduction of heat is poor, for contacting an annular piston 30 which is suitably sealed for movement in an annular chamber 32. Conventional means are provided for admitting fluid under pressure to the chamber 32 to apply or engage the brake mechanism 10 and for venting or draining the fluid to release or disengage the brake mechanism 10. Specifically, the fluid under pressure within the chamber 32 acts upon the piston 30 forcing it outward from the chamber, i.e., to the right as viewed in FIGURE 1, into contact with the washer 28. The primary plate is thereby shifted to the right forcing the disk 18 and 22 into engagement with each other and with the wall 17. The normal force supplied by the fluid pressure acting on the piston 30 determines the frictional force produced by the brake to stop or retard the axle 12, assuming, of course, that the coefficient of friction between the linings 20 and the wall 17, the stator disk 22 between the linings 20 and the wall 17, the stator disk 22 and the primary plate 24 remains constant. The amount of movement or travel by the piston 30 required to bring all of the elements positioned between the wall 17 and the piston 30 into contact with each other is referred to as the clearance. In order to maintain this clearance approximately constant, an adjustment has to be made for the wear encountered in the linings 20. Since there is frictional resistance to return of the elements to their original position upon release of the pressure and since there is a slight pre-charge pressure within the chamber 32, some return force is required to provide the clearance. Both of these functions are accomplished by the combined return and adjustment means, indicated generally at 34, which consists of a plurality of blind bores 36 positioned about and parallel to the axle 12 in the wall 17. A pin 38 is retained, as by a press fit, for example, in each bore 36 and a tubular member 40 is positioned on each pin 38 between the wall 17 and the primary plate 24. This member 40 is formed of a material having physical properties such that when subjected to a stress greater than a predetermined stress it will crush or plastically deform and when subjected to a stress less than the predetermined stress it will elastically deform. The stress developed in the member 40 is a function of the amount of piston travel required to take up the clearance, i.e., to bring the disks, plate and wall into contact. That is, the member 40 will be stressed as the piston 30 moves out of the chamber, but once the elements i.e., the disks 18 and 20 are brought into contact with the wall, any further force applied by the piston will not be resisted by the member 40. If this stress is below the predetermined value, the member will be elastically deformed and when the pressure is released, the member 40 will expand returning the primary plate 24 and the piston 30 to their original positions and providing the required running clearance. However, as the linings 20 wear, the piston 30 must move a greater distance to bring the plate, the disks and the wall into contact. The member 40 will therefore, be subjected to greater stress, above the predetermined value, causing plastic deformation substantially equal to the wear on the linings 20. Release of the pressure will permit the member to expand supplying the desired return bias. However, the plate and piston will not return to their original positions but to a new position wherein the clearance remains the same as it was before the linings became worn. To achieve this the material from which the member 40 is constructed must possess the property of having a spring constant which remains substantially the same even after a portion thereof has been plastically deformed. A material which exhibits all of these properties is loosely sintered metal powder and preferably iron powder, such as that marketed by Burgess Norton Mfg. Co., identified by the name of Filter Grade Sintered Metal. Another suitable material is foamed aluminum. These materials when designed to be stressed at levels below the elastic limit of the metal per se retains a substantially constant spring rate, i.e., the same slope on a stress-strain curve, but when stressed to a certain point causes, in the case of metal powders, the metal particles to be more tightly packed increasing the density locally and in the case of aluminum foam, causes the bubbles trapped within the material to callapse, also increasing density.

Each of the pins 38, when bottomed against the blind bores 36, has a length, relative to the length of the member 40, such that their free ends 42 are spaced from the plate 24, when initially installed. Such an arrangement allows the member 40 to plastically deform only until the plate 24 contacts the pins 38. When the distance from the plate to the free end 42 is arranged to be equal to the amount of total wear tolerable on the linings 20, the disks, wall and plate will be protected from scoring and will provide the operator with an indication that lining replacement is needed by reducing the braking ability. That is, as the pin 38 comes into contact with the plate 24 the force applied by the piston 30 will be reacted by both the disks and the pin, thereby decreasing the normal force available for braking effort. The operator will feel the sharp increase in pedal force required for the desired deceleration, thereby being made aware of the need for new linings.

The embodiment shown in FIGURE 2 is similar to that in FIGURE 1, the difference being in the return and adjustment means 34. A plurality of pins 48, which may be of smaller diameter than the pins 38 of the embodiment in FIGURE 1, are retained in blind bores 46. A spacer block 49 is positioned over each of the pins adjacent the wall 17. A tubular member 50 having a plan area complementary to that of the block 49 is positioned over the free end 52 of the pins 48. The wall thickness or plan area may be increased or the number of members utilized may be increased so that the results achieved are the same as for the embodiment of FIGURE 1. The advantage that this embodiment provides concerns the ease of manufacture and assembly. A loosely sintered iron powder is fragile and must be handled with care. Their bending strength is increased if they are shorter, and hence chances for accidental breakage during assembly of the brake mechanism is greatly reduced. In addition, since less of the sintered material is used, the cost of the unit is lower; the spacer block 49 being of less expensive material than the sintered powder. The casting or forging of the wall 17 is also simplified through the use of the block 49. The operation of the return and adjustment means 34 of this embodiment is, in all other respects, the same as for that of FIGURE 1.

The embodiment shown in FIGURE 3 has a return and adjustment means 34 which comprises a plurality of guide pins 54 formed on or otherwise secured to the plate 24. A sleeve 56 having a closed end 58 is slidably received on each of the pins 54 and has its closed end 58 positioned within a blind bore 60. A cylindrical member 62 having the proportion of loosely sintered powdered iron is retained within the sleeve 56 between the closed end 58 and the pin 54. The advantage of this arrangement is that the member 62 can be inserted into the sleeve 58 initially and remote from the brake under conditions which permit the care and caution necessary to avoid breaking the member 62. The assembled sleeve and member can then be manipulated into the assembly as a unit during which operation the fragile member 62 is protected by the sleeve 58 from contact with other elements, thereby reducing the chances for breakage. Since the member 62 is completely enclosed, the spring rate is likely to be different from those modifications in which the sintered material member is exposed, and hence it may be desirable to include a flat spring 64, e.g., a Belleville washer, between the closed end 58 and the bottom of the blind bore 60. Such a spring would provide only a portion of the bias or return force in order to achieve the desired spring rate. The sintered material would supply the remainder of the required bias and, of course all of the adjustment for wear allowance. The sintered material functions well in a closed container, where other materials might fail, because plastic deformation is achieved by compression, i.e., an increased density, of the material.

We claim:

1. In a disk brake for braking an axle rotatably mounted in a housing, said brake having a plurality of exially slidable rotor and stator disks mounted about said axle within said housing in coaxial interleaved position, actuating means operative within said housing and movable between an engaged position wherein frictional braking engagement of said disks is effected by axially compressing said disks into frictional interengagement and a relaxed position wherein said actuating means is spaced from said disks to provide a running clearance; the improvement comprising:

automatic adjusting and return means interposed between said actuating means and said housing, said automatic means being strained as said actuating means moves from said relaxed position to said engaged position, said automatic means being formed of metal particles with spaces therebetween so that the metal particles are elastically deformed and said spaces remain unchanged when said strain is no greater than said clearance and the metal particles are compacted with said spaces decreasing when said strain is greater than said clearance, the compaction being sufficient to compensate for wear of said disks, and said elastic deformation supplying a bias force to return said actuating means at least partially to said relaxed position.

2. In a disk brake according to claim 1 wherein said automatic adjusting and return means is constructed of loosely sintered powdered metal.

3. In a disk brake according to claim 1 wherein said automatic adjusting and return means is formed of foamed aluminum.

4. In a disk brake according to claim 1 wherein said automatic adjusting and return means comprises a guide means carried by one of said housing and said actuating means, and a member engaging said guide means and positioned between said actuating means and said housing, said member having properties such that when strains therein exceed a predetermined value it is plastically deformed by increasing the density and when strains are below said value it is elastically deformed.

5. In a disk brake according to claim 4 wherein said guide means comprises pin means retained by said housing substantially transverse to said actuating means, and said member is tubular and is positioned on said pin means between said housing and said actuating means.

6. In a disk brake according to claim 5 wherein said tubular member is made of loosely sintered powder metal.

7. In a disk brake according to claim 5 wherein said tubular member is made of foamed aluminum.

8. In a disk brake according to claim 5 and further comprising spacer block means positioned on said pin means between said member and said housing.

9. In a disk brake according to claim 8 wherein said tubular member is made of loosely sintered powdered iron.

10. In a disk brake according to claim 8 wherein said tubular member is made of foamed aluminum.

11. In a disk brake according to claim 4 wherein said guide means comprises a pin on said actuating means, and a sleeve having a closed end retained in said housing and having its other end slidably engaging said pin, and said member being trapped within said sleeve between the closed end and said pin.

12. In a disk brake according to claim 11 wherein said member is made of loosely sintered powdered metal.

13. In a disk brake according to claim 11 wherein said member is made of foamed aluminum.

14. In a disk brake according to claim 12 and further comprising spring means positioned between said housing and said closed end.

References Cited
UNITED STATES PATENTS

| | | | |
|---|---|---|---|
| 2,743,790 | 5/1956 | Bricker | 188—196 X |
| 3,286,795 | 11/1966 | Barrett et al. | 188—196 X |

FERGUS S. MIDDLETON, *Primary Examiner.*

G. E. A. HALVOSA, *Assistant Examiner.*